United States Patent

[11] 3,588,538

[72] Inventor Vincent M. Picillo
Orlando, Fla.
[21] Appl. No. 701,004
[22] Filed Jan. 26, 1968
[45] Patented June 28, 1971
[73] Assignee the United States of America as represented by the Secretary of the Army

[54] ELECTRONIC SWITCH
4 Claims, 1 Drawing Fig.

[52] U.S. Cl. 307/246, 307/202, 307/254
[51] Int. Cl. H03k 17/00
[50] Field of Search 307/246, 254, 239, 292

[56] References Cited
UNITED STATES PATENTS

| | | | |
|---|---|---|---|
| 2,991,375 | 7/1961 | Abraham et al. | 307/223 |
| 3,188,496 | 6/1965 | Ballard | 307/202 |
| 3,476,956 | 11/1969 | Bargess et al. | 307/317X |
| 2,728,857 | 12/1955 | Sziklai | 307/254X |
| 2,999,968 | 9/1961 | Weiss | 307/239X |
| 3,160,766 | 12/1964 | Reymond | 307/239 |
| 3,292,105 | 12/1966 | Brinker | 307/292 |

*Primary Examiner*—Donald D. Forrer
*Assistant Examiner*—B. P. Davis
*Attorneys*—Harry M. Saragovitz, Edward J. Kelly, Herbert Berl and Harold W. Hilton

ABSTRACT: An electronic switch that utilizes the parallel connection of a transistor switching circuit with an inverted-transistor switching circuit for discharging integrating capacitors regardless of the charge polarity on the capacitors. Diodes connected to the base of each transistor prevent reverse voltage breakdown of the base-collector and base-emitter junctions. The switch offers a low saturation voltage for both positive and negative load voltages, good control of switching variables and transients, and has a fast response time.

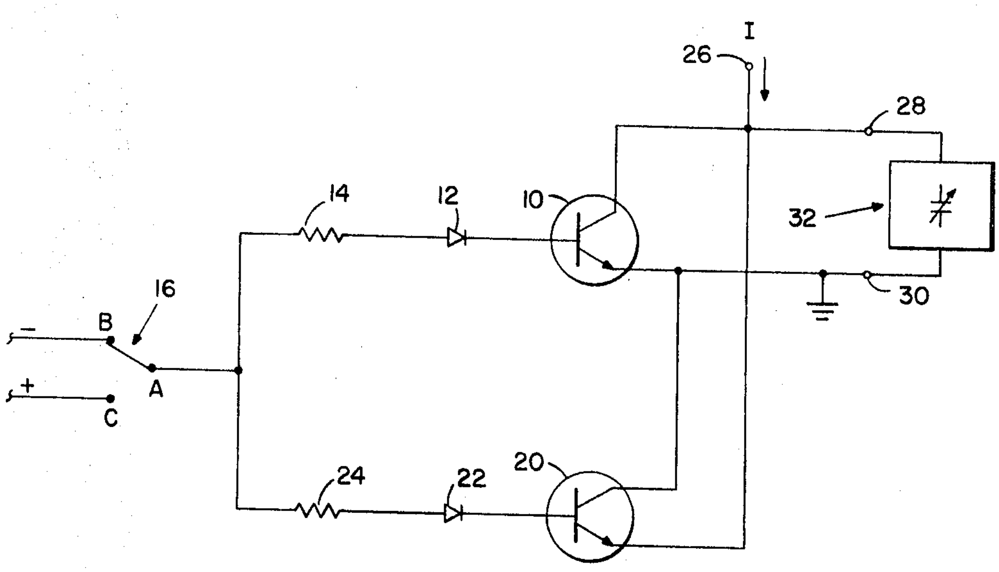
Vincent M. Picillo,
INVENTOR.
BY Harry M. Saragovitz
Edward J. Kelly
Herbert Berl
Harold W. Hilton

ELECTRONIC SWITCH

SUMMARY OF THE INVENTION

The electronic switch of the present invention has a fast response time to a trigger signal, which opens or closes a current path parallel with a load. Integrating capacitors, which form a load, are charged periodically to same positive or negative value. After each charging pulse, these capacitors are discharged through the electronic switch prior to succeeding pulses. The electronic switch includes a parallel combination of a common-emitter transistor circuit with a common-emitter inverted-transistor circuit, which allows the switch to discharge both positive and negative load charges. The low saturation voltage of the switch allows load voltage to reach a low value when discharging, thereby having a minimum potential across the load immediately after discharge periods. The parallel transistor circuit discharges a negative charge on the load just as readily as a positive charge.

It is, therefore, an object of the present invention to provide an accurate control of switching variables and transients.

Another object of the present invention is to provide improved switching apparatus having a fast response time and low saturation voltages.

BRIEF DESCRIPTION OF THE DRAWING

The single FIGURE is a schematic diagram of an electrical switch according to the present invention used with a capacitive load.

DESCRIPTION OF THE PREFERRED EMBODIMENT

Referring now to the single FIGURE, there is shown a first transistor 10, having the base thereof connected through a diode 12 and a resistor 14 to a terminal A of a switch 16. A second transistor 20, has the base thereof connected through a diode 22 and a resistor 24 to terminal A of switch 16. The collector of transistor 10 is connected to the emitter of transistor 20; through a terminal 26 to a current source (not shown); and through a terminal 28 to a capacitive load 32. The emitter of transistor 10 is connected to the collector of transistor 20; to a circuit ground; and through a terminal 30 to another side of the capacitive load 32. A negative potential is applied to a terminal B of switch 16 and a positive potential is applied to a terminal C of switch 16.

When switch 16 is in position "A—B," transistors 10 and 20 are in the off state and present a high impedance to a positive charging current applied to terminal 26. This current charges capacitive load 32 to a given voltage during the charging time period. After the charging period, switch 16 is placed in position "A—C" which places transistors 10 and 20 in an on state. The base-emitter junction of transistor 10 and the base-collector junction of transistor 20 are forward biased, resulting in the discharge of capacitive load 32 through the transistors. When terminal 28 is positive with respect to ground terminal 30, transistor 10 will operate in its normally forward direction and will have a higher current gain than transistor 20. Therefore, transistor 10 will be primarily responsible for discharging load 32 to the transistor collector-emitter saturation voltage.

When the saturation voltage of transistor 10 is reached, transistor 10 will stop conducting but transistor 20 will continue to discharge the load 32. Transistor 20 will discharge the load to the transistors inverted collector-emitter saturation voltage. Since transistor 20 is operating in its inverted mode, its voltage saturation point will be lower than that of transistor 10. Switch 16 will then be placed back in position "A—B" and the circuit will be ready for the next charging cycle.

When the voltage across load 32 is negative (terminal 28 is negative with respect to ground), the discharging sequence is the same as has been presented except that the roles of transistor 10 and transistor 20 are exchanged.

Diodes 12 and 22, connected to the base of transistors 10 and 20 respectively, prevent reverse voltage breakdown of the base-collector and base-emitter junctions when the reverse voltage is excessive, thereby preventing destruction of the transistor involved.

The electronic switch reduces residual voltages in a capacitive load to an insignificant value prior to receipt of another input signal to the load. Although type NPN transistors have been used, it is understood that type PNP transistors may be used by reversing the applied voltages and diodes.

Although a preferred embodiment of the invention has been described, it will be obvious to those skilled in the art that various changes may be made without departing from the true spirit and scope of this invention as set forth in the specification and the appended claims.

I claim:

1. A switching circuit for discharging capacitors comprising: first and second switching means disposed for simultaneous energization and for deactivation at different predetermined levels, to provide parallel conductive circuits, said first and second switching means are first and second transistors of the same conductivity type, the collector and emitter of said first transistor being connected respectively to the emitter and collector of said second transistor; turn-on means common to said first and second switching means for simultaneously placing said switching means in an "on" state; a first series-connected resistor and diode connected between the base of said first transistor and said turn-on means; a second series-connected resistor and diode connected between the base of said second transistor and said turn-on means; and a variable capacitive load connected between the collector and emitter of said first transistor.

2. The switching circuit as set forth in claim 1 wherein said turn-on means is a switch having a common terminal connected to the resistors of said first and second series-connected resistor and diode.

3. The switching circuit as set forth in claim 2 wherein said switch has a first terminal connected to a negative potential and a second terminal connected to a positive potential and said load is a capacitance.

4. The switching circuit as set forth in claim 1 wherein said first and second switching means are first and second NPN transistors, and said diodes have the cathodes thereof connected to respective transistor bases for preventing base-collector and base-emitter junction reverse voltage breakdown.